Jan. 7, 1941.  LE ROY T. BARNETTE ET AL  2,227,431
COMPOSITE STRUCTURE, SUCH AS GRILLES
Filed June 15, 1938

INVENTORS
LEROY T. BARNETTE &
FREDERICK L. HAHN
BY John H. Leonard,
his ATTORNEY.

Patented Jan. 7, 1941

2,227,431

UNITED STATES PATENT OFFICE 2,227,431

COMPOSITE STRUCTURE SUCH AS GRILLES

Le Roy T. Barnette, St. Clair, and Frederick L. Hahn, Algonac, Mich., assignors, by mesne assignments, to The Standard Products Company, Port Clinton, Ohio, a corporation of Ohio Application June 15, 1938, Serial No. 213,896

7 Claims. (Cl. 189—82)

This invention relates to a composite article of manufacture made partly from sheet metal and partly from a strengthening and stabilizing material for the sheet metal, so that the sheet metal can be exposed as wear-resisting or decorative surfaces of the article, and to a method of making such articles.

An object is to provide an improved reinforcement for drawn or stamped sheet metal parts to the end that the thickness of the sheet metal may only be sufficient to enable forming of it, while enabling it to resist indentation over its entire exposed surface.

The objects further include the provision of an article of manufacture employing sheet metal as an exposed portion of the article, and relatively yielding moldable material united thereto as a stabilizing reinforcement for the metal.

A further object is to provide a mounting or stabilizing means for formed sheet metal members which can be used effectively to insulate such members with respect to heat and electric current, or prevent vibration and transmission of sound waves.

A specific object is to provide a grille or lattice structure, made partly from light sheet metal but in such a manner as to eliminate drumming, or rattling, when subjected to forces tending to cause such action.

Another object is to provide a simple means for stream-lining and/or strengthening sheet metal stampings fashioned to provide grille bars, etc. subject to relatively rapid movement through fluid media.

Another object is to provide, as an article of manufacture, a grille formed in part as a stamping of relatively thin metal, portions of which are of channel section so as to provide grille bars and/or supporting framework for such bars, which metal stamping would not, of itself be sufficiently strong to serve the intended purpose; but which stamping is strengthened adequately by relatively hardened rigid plastic material lying in intimate contact with the hollow or concave portions of the stamping substantially coextensively therewith, thereby both strengthening the grille as a whole and enabling the exposed metal very effectively to resist local impact by objects such as would be likely to strike the grille in normal use, without likelihood of indenting the metal.

Other objects and features will become apparent from the following description relating to the accompanying drawing. The essential characteristics are summarized in the claims.

The invention will be described as adapted for the employment of thermoplastic material which can be injected under high pressure into a mold, but is not necessarily limited thereto. Thermal setting materials can also be used to advantage.

In the accompanying drawing, Fig. 1 is a front elevation of a radio cabinet having a grille disposed across the loud speaker compartment;

Figs. 2 and 3 are fragmentary transverse sectional views of the grille as indicated by the lines 2—2 and 3—3 on Fig. 1;

Figure 1:
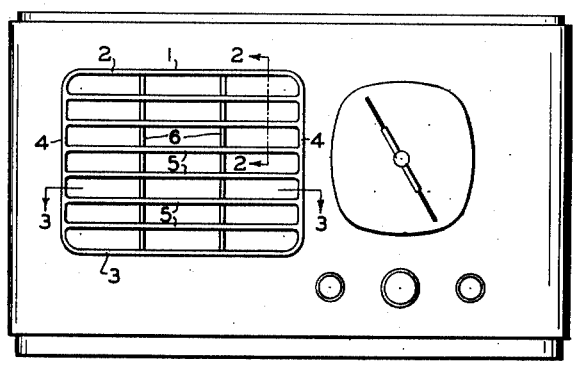

One method or process for making objects such as hereinafter described is shown, described, and claimed in our copending application Serial No. 270,682, filed April 28, 1939.

The embodiment of the invention illustrated is applicable, for example, to practically all uses wherein grille work or lattice work is desirable or necessary as in order to admit light, heat, air or sound into or out of a compartment or duct. Use on radio is by way of example. Let us suppose the problem is to provide a grille which has metal on the principal exposed surfaces, as in order to facilitate cleaning of the grille or to resist chemical action or merely for appearance. A cast metal grille of large size and strong enough to withstand the load of persons or furniture accidentally bumping or being bumped against it, would be of relatively heavy section. If made of light sheet metal and formed as usual to resist such loads, the metal would, in the specific instance shown, be vibrated by sound waves and/or air currents and be relatively unsatisfactory. Grille bars made with the usual semi-hollow sections (channels, angles, semi-cylindrical shapes, etc.) offer considerable resistance to the flow of air past them and in locations, such for instance, as at entrances to injector or ejector ventilator air shafts in buildings—either indoors or out-side—, air currents cause the grilles to vibrate and emit objectionable sounds. If mounted on a vehicle, sheet metal grilles of such sections would have a tendency to rattle and drum. Other problems are presented by having to mount grilles and similar structures in locations in which they are subjected to high degrees of heat or in which they may be connected, e. g., accidentally, to electric current lines. A grille structure, or the like, that is at least partially substantially non-conductive with respect to heat and electricity, is rattle-proof and generally of sound-deadening character, is therefore highly desirable. The grille structure herein shown is substantially free from the objectionable features above referred to and has the desirable characteristics mentioned.

Referring further to the drawing, the grille 1 may be a rectangular structure with top and bottom frame bars 2 and 3, end frame bars 4, spaced horizontal grille bars 5 and vertically connecting and reinforcing spaced grille bars 6. The exposed face of the grille can comprise a single piece metal stamping with channel effects 10 and flanges 11 turned back from the web or exposed face in the manner sheet metal grille bars are frequently made.

Figure 4:
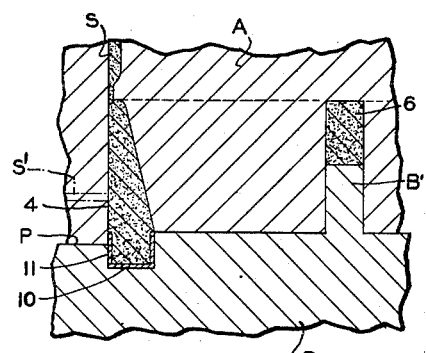
Fig. 4 is a partial sectional view of two mold members in closed position which mold members are adapted to form the grille shown. Molded portions of the grille (corresponding to those at the left of Fig. 3) are shown in the mold cavity.
Figure 5:
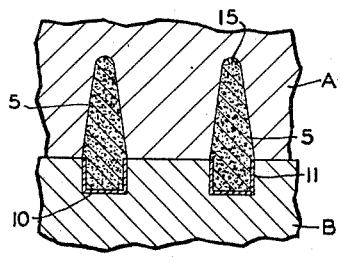
Fig. 5 is a similar sectional view of the mold members in closed position, as though taken at right angles to Fig. 4.
Figure 6:
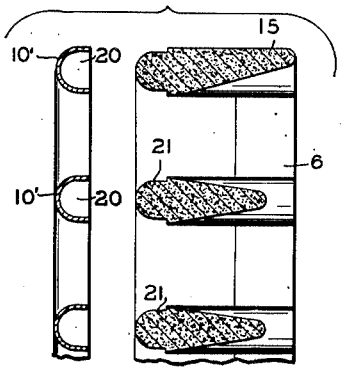
Fig. 6 is an exploded view of shell and reinforce portions of a modified grille, the figure showing the molded part as though made in a mold so configured that portions of the molding will fit the shell.
Figure 7:
Fig. 7 is a detail cross-sectional view of a modified grille bar and anchoring means between the metal shell and the molded reinforcement.

The channels can be made of any shape, for instance, with practically square corners joining the web and flange effects, as shown in Figs. 1 to 5, or semi-cylindrical or V-shaped or of parabolic section as desired; cf Figs. 6 and 7.

The shell is preferably preformed as by suitable dies, and a single stamping may comprise the entire grille face or separate stampings any desired portions of it. Assuming the shell is one piece of sheet metal such as stainless steel from a few thousandths to ½₂" in thickness, this can be reinforced, rendered rattle-proof, streamlined, etc., by a grille backing of molded non-metallic material indicated wherever it appears, as 15. The molded material preferably is thermoplastic material, such as cellulose acetate. All portions of the plastic which form the grille or a single grille section can be integrally interconnected as by forming the same in separable molds in a single molding operation. A plurality of molded members may, however, be used with a single shell, and likewise the shell part may be made in sections applied to a single molding.

The forward portion of each reinforcement provided by the plastic lies tightly against the webs of the channels to which it is adjacent, closely embraced by the flanges 11 thereof, so that the shell will adequately resist being indented, even though very thin. The rear or back portions of the molding preferably extend for a considerable distance out of the channel effects and in the direction of extent of the flanges, and the individual reinforcing bar effects so provided preferably diminish in cross section substantially as indicated. Such shape affords considerable strength in a direction normal to the exposed face of the grille while conserving material. The diminishing section also streamlines the individual grille bars, as is desirable particularly where the grille is to have fluid media passed therethrough at considerable speed. The molded portion of the grille is ordinarily concealed in use and this permits the use of second run or scrap materials or generally lower cost materials for molding than would be required if exposed in use. Other important characteristics of the backing for the sheet metal will be brought out in connection with the following description of the manner of forming the article.

To form the grille we preferably employ mold members such as A and B, which preferably separate along a generally horizontal parting line. Portions only of such mold members are shown in Figs. 4 and 5. Fig. 4 shows the portion of the mold which forms one of the end frame bars 4 (e. g. left end) and one of the vertical bars 6; and Fig. 5 shows a portion of the mold as though cut where forming two adjacent horizontal grille bars 5. The plane of the parting line P of all portions of the mold beyond the perimetral boundaries of the grille-forming cavities can intercept the outer flanges 11 of the shells so that no flash will be formed on the outer portions of the finished grille. However, the parting line may be flush with the free edges of the flanges as indicated in Fig. 5, and in some instances may intercept the cavity portions which receive the plastic material, as above the flanges in the position of the mold shown. The parting line can be partially at one elevation and partially at another.

The preformed sheet metal shell is seated into the bottom mold cavity and thermoplastic material is introduced, for example, at both ends of the grille forming cavities. For instance, the material can be introduced at points intermediate of the ends of the cavities which form the end frame bars 4, as suggested at S (Fig. 4). If vertically introduced, as illustrated in full lines, the direction tends to seat the metal shell more firmly on the bottom mold cavity and prevent the plastic material from running under the sheet metal. Alternatively the sprue extension can enter the cavity as shown at S' in broken lines for substantially the same effect.

Figure 2:
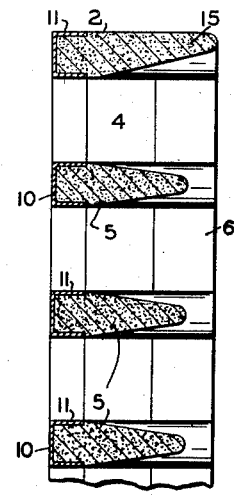
Figure 3:
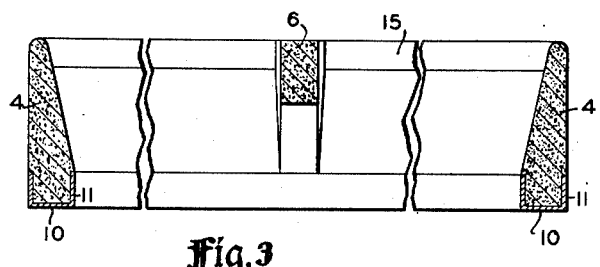

When it is desired that the vertical connector bars 6 be set back from the exposed face of the grille as suggested in Figs. 2 and 3, the bottom mold member would be built up at B'. In the case of using cellulose acetate this material is injected into the mold under several tons pressure, the entire cavity is immediately filled, and the plastic material firmly seated against the channel webs and flanges so that firm adherence of the shell to the backing portion of the grille is subsequently maintained.

The grille may be generally flat, as illustrated, or curved, or of any other form; mold design being varied according to the shape desired.

In some instances, it is desirable to form the backing in a mold separate from the shell portions of the article, in which event the inner portions of the shell, that is, its indented surfaces, as at 20, Fig. 6, of channel effects 10', are made substantially complementary to portions such as 21 of the molding which they are to fit, or with slightly smaller dimensions, so as to require pressure to spring the metal into place.

Adherence between the metal and molded material can be secured by suitable adhesive or by deformation of the surfaces of the sheet metal which come adjacent the plastic. Roughening, as indicated at 22 in Fig. 7, on the channel portion of the sheet metal can be effected before the sheet metal is formed to shape. Alternatively, portions of the sheet metal flanges can be diverted so as to interlock with the plastic.

To aid in fastening the metal to the molded part, the indented surfaces of the shell can be precoated with material that is subject to the same solvents as the plastic material or that can be secured to molded thermoplastic or thermal-setting materials more readily than can metal. For instance, in the case of using cellulose acetate as the molding material the metal shell can be precoated with cellulose lacquer (e. g. baked on) and the coating of the shell and the surface of the backing which fits into the shell softened as with acetone before the two parts are brought or pressed together.

In securing the grille to a cabinet, building or vehicle structure, the necessary fastenings can be made at the relatively non-conductive (molded) part as by appropriate bosses, screw holes, etc. (not shown) formed on the molding and thus insulate the metal from parts of the structure to which secured.

We claim:

1. In a grille, a grille bar, comprising a relatively thin sheet metal trough and hardened plastic material intimately filling the trough and extending from its open side a distance materially greater than the depth of the trough to reinforce the bar.

2. A grille or grille section having a one-piece sheet metal facing of shell form with interconnected grille bars, and a reinforcing backing for the facing secured in intimate contact with the hollowed side of the shell, protruding a substantial distance therefrom and of a material which is a poor conductor of heat and electricity.

3. A grille bar having a sheet metal facing portion concave on its back side and a reinforcing rib having a front portion extending into intimate contact with the concavity and extending rearwardly from the facing a substantial distance and gradually diminishing in cross section.

4. As an article of manufacture, a grille member having a relatively light sheet metal facing with hollow surface effects on one side, and a backing comprising a molding of organic plastic material of relatively rigid nature, said molding having portions which lie in the hollow effects of the facing in intimate contact with the hollow effects throughout substantially the entire extent thereof so as to reinforce the metal against being indented at its exposed face.

5. A grille which has interconnected channel-shaped bar portions of relatively thin sheet metal as a facing and hardened plastic material in intimate contact with the inner surfaces of the channels and constituting a relatively rigid backing for the sheet metal.

6. In a grille, a light gage sheet metal stamping which forms a facing portion for the grille, the stamping comprising a frame with spaced grille bar members which are channel shaped in section and connected at their ends to the frame, and a hardened plastic molding constituting a backing for the frame and bar member portions of the stamping, said molding having forward bar member portions extending between the flanges of respective channels into intimate contact with the inner surfaces of the channels to provide reinforcement for the sheet metal against indentation thereof as by impact, rear portions of the bar members of the molding extending from the channels for at least as great a distance as the depth of the respective channels, whereby to reinforce the metal grille bar members against deflection intermediate of the end portions of the bar members.

7. In a grille, a light gage sheet metal stamping which forms a facing portion for the grille, the stamping comprising a frame and spaced grille bars which are channel shaped in section, and a hardened plastic molding constituting a backing for the stamping, said molding having forward portions extending between the flanges of respective channels into intimate contact with substantially all inner surfaces of the channels to provide reinforcement for the sheet metal against indentation thereof as by impact, rear portions of the molding extending from the respective channels for at least as great a distance as the depth of the respective channels, whereby to reinforce the portions of the bars intermediate of their ends against general deflection, said rear portions, adjacent the channels, being of approximately the same width as the channels and of rearwardly diminishing cross section, whereby to constitute stream lined extensions of the channels.

LE ROY T. BARNETTE.
FREDERICK L. HAHN.